(12) United States Patent
Luthe et al.

(10) Patent No.: US 12,038,764 B2
(45) Date of Patent: *Jul. 16, 2024

(54) DEVICE AND METHOD FOR PREVENTING A COLLISION WHEN DRIVING AT LEAST TWO MOVING ELEMENTS ON A DRIVING SURFACE

(71) Applicant: Beckhoff Automation GmbH, Verl (DE)

(72) Inventors: Thomas Luthe, Verl (DE); Hubertus Pennekamp, Gütersloh (DE); Eva Wiedner, Hövelhof (DE); Tobias Weber, Verl (DE); Klaus Neumann, Gütersloh (DE); Alexander Weddemann, Lippstadt (DE)

(73) Assignee: Beckhoff Automation GmbH, Verl (DE)

( * ) Notice: Subject to any disclaimer, the term of this patent is extended or adjusted under 35 U.S.C. 154(b) by 496 days.

This patent is subject to a terminal disclaimer.

(21) Appl. No.: 17/328,162

(22) Filed: May 24, 2021

(65) Prior Publication Data

US 2021/0278863 A1    Sep. 9, 2021

Related U.S. Application Data

(63) Continuation of application No. PCT/EP2019/082257, filed on Nov. 22, 2019.

(30) Foreign Application Priority Data

Nov. 26, 2018  (DE) ...................... 10 2018 129 732.7

(51) Int. Cl.
*G05D 1/00*     (2024.01)
*B65G 54/02*    (2006.01)
(Continued)

(52) U.S. Cl.
CPC ........... *G05D 1/0289* (2013.01); *B65G 54/02* (2013.01); *B66F 9/063* (2013.01); *G05D 1/0088* (2013.01);
(Continued)

(58) Field of Classification Search
CPC .. G05D 1/0289; G05D 1/0088; G05D 1/0214; G05D 1/0259; G05D 2201/0216;
(Continued)

(56) References Cited

U.S. PATENT DOCUMENTS 6,097,114 A    8/2000  Hazelton
6,316,849 B1   11/2001 Trumper et al.
(Continued)

FOREIGN PATENT DOCUMENTS

CN    1330807 A     1/2002
CN    101537932 A   9/2009
(Continued)

OTHER PUBLICATIONS

Machine translation of CN-103135640-A (Year: 2013).*
(Continued)

*Primary Examiner* — Alan D Hutchinson
(74) *Attorney, Agent, or Firm* — Dorsey & Whitney LLP

(57) ABSTRACT

A device and method for preventing a collision when determining travel paths for at least two movers on a drive surface, each mover comprising at least a second magnetic field generator, the device comprising a plurality of sectors, the sectors comprising magnetic field generators for generating magnetic fields, the sectors forming the drive surface. A path planning for at least two movers is carried out, at least the two movers being assigned a priority, the priorities of the movers being taken into account in the path planning such that a path of a mover is assigned a priority in the path planning of the travel paths of the movers, and a travel path
(Continued)

of a mover with a higher priority takes precedence over a travel path of a mover with a lower priority, so that a collision of the movers is prevented.

19 Claims, 7 Drawing Sheets

(51) Int. Cl.
    *B66F 9/06*            (2006.01)
    *B66F 17/00*          (2006.01)

(52) U.S. Cl.
    CPC ......... *G05D 1/0214* (2013.01); *G05D 1/0259* (2013.01); *B66F 17/00* (2013.01)

(58) Field of Classification Search
    CPC .......... B65G 54/02; B66F 9/063; B66F 17/00; G05B 2219/31003; G05B 2219/50393; G05B 19/4061; G05B 19/4187; G05B 19/41895; Y02P 90/02; Y02P 90/60
    See application file for complete search history.

(56) References Cited

U.S. PATENT DOCUMENTS

| | | |
|---|---|---|
| 6,339,266 B1 | 1/2002 | Tanaka |
| 6,417,914 B1 | 7/2002 | Li |
| 6,835,941 B1 | 12/2004 | Tanaka |
| 7,339,289 B2 | 3/2008 | Wang et al. |
| 8,281,888 B2 | 10/2012 | Bergmann |
| 9,187,268 B2 | 11/2015 | Denninger et al. |
| 9,202,719 B2 | 12/2015 | Lu et al. |
| 9,701,487 B2 | 7/2017 | Unterseher |
| 10,222,237 B2 | 3/2019 | Lu |
| 10,352,953 B2 | 7/2019 | Huber et al. |
| 10,370,195 B2 | 8/2019 | Huber |
| 10,509,049 B2 | 12/2019 | Sinz et al. |
| 10,669,049 B2 | 6/2020 | Eberhardt et al. |
| 10,763,733 B2 | 9/2020 | Lu |
| 11,855,557 B2 | 12/2023 | Luthe et al. |
| 2005/0107909 A1 | 5/2005 | Wynblatt et al. |
| 2008/0051984 A1 | 2/2008 | Wurman et al. |
| 2011/0093134 A1 | 4/2011 | Emanuel et al. |
| 2017/0163140 A1 | 6/2017 | Lu |
| 2017/0179805 A1 | 6/2017 | Lu |
| 2017/0179806 A1 | 6/2017 | Lu |
| 2017/0217460 A1 | 8/2017 | Huber et al. |
| 2017/0344009 A1 | 11/2017 | Wernersbach |
| 2017/0361731 A1 | 12/2017 | Cromheecke et al. |
| 2018/0102681 A1 | 4/2018 | Prüssmeier |
| 2018/0217174 A1 | 8/2018 | Malinowski |
| 2018/0373255 A1 | 12/2018 | Wernersbach |
| 2020/0223645 A1 | 7/2020 | Feyrer |
| 2021/0273592 A1 | 9/2021 | Luthe et al. |
| 2021/0273593 A1 | 9/2021 | Luthe et al. |
| 2021/0281203 A1 | 9/2021 | Luthe et al. |
| 2021/0328493 A1 | 10/2021 | Luthe et al. |

FOREIGN PATENT DOCUMENTS

| | | | |
|---|---|---|---|
| CN | 101779368 A | | 7/2010 |
| CN | 103135640 A | * | 6/2013 |
| CN | 103891114 A | | 6/2014 |
| CN | 104094507 A | | 10/2014 |
| CN | 105307960 A | | 2/2016 |
| CN | 105452812 A | | 3/2016 |
| CN | 105600469 A | | 5/2016 |
| CN | 106168627 A | | 11/2016 |
| CN | 106716141 A | | 5/2017 |
| CN | 107852082 A | | 3/2018 |
| DE | 102009008529 A1 | | 9/2010 |
| DE | 102006007623 B4 | | 6/2015 |
| DE | 102015209610 A1 | | 12/2016 |
| DE | 102017131304 A1 | | 6/2019 |
| DE | 102017131314 A1 | | 6/2019 |
| DE | 102017131321 A1 | | 6/2019 |
| DE | 102018129727 A1 | | 5/2020 |
| DE | 102018129731 A1 | | 5/2020 |
| DE | 102018129732 A1 | | 5/2020 |
| DE | 102018129738 A1 | | 5/2020 |
| DE | 102018129739 A1 | | 5/2020 |
| EP | 2047376 B1 | * | 8/2015 ............... G05D 3/00 |
| EP | 3095739 A1 | | 11/2016 |
| EP | 3096144 A1 | | 11/2016 |
| EP | 3385803 A1 | | 10/2018 |
| EP | 3868005 B1 | | 6/2022 |
| JP | H03112393 A | | 5/1991 |
| JP | 2000125536 A | | 4/2000 |
| WO | 2013059934 A1 | | 5/2013 |
| WO | 2013064656 A1 | | 5/2013 |
| WO | 2015017933 A1 | | 2/2015 |
| WO | 2015179962 A1 | | 12/2015 |
| WO | 2015184553 A1 | | 12/2015 |
| WO | 2015188281 A1 | | 12/2015 |
| WO | 2016012157 A1 | | 1/2016 |
| WO | 2016012160 A1 | | 1/2016 |
| WO | 2016012171 A1 | | 1/2016 |
| WO | 2017004716 A1 | | 1/2017 |
| WO | 2018176137 A1 | | 10/2018 |
| WO | 2019170488 A1 | | 9/2019 |
| WO | 2020109168 A1 | | 6/2020 |
| WO | 2020109180 A1 | | 6/2020 |
| WO | 2020109274 A1 | | 6/2020 |
| WO | 2020109276 A1 | | 6/2020 |
| WO | 2020109287 A1 | | 6/2020 |

OTHER PUBLICATIONS

Office Action dated Jan. 6, 2022 in connection with Chinese patent application No. 201980077654.5, 7 pages Including English translation.
Office Action dated Dec. 24, 2021 in connection with Chinese patent application No. 201980077844.7, 10 pages Including English translation.
Notification of an Objection received in connection with European patent application No. 19817165.4, dated Mar. 7, 2023, 41 pages including English translation.
Enze, Jiang et al. "Analysis of Current Distribution for Permanent Magnet Synchronous Planar Motors," Proceedings of the CSEE, vol. 31, No. 9, Mar. 25, 2011, 5 pages.
Kim, Won-jong et al. "Modeling and Vector Control of Planar Magnetic Levitator," IEEE, vol. 34, No. 6, Nov. 1998, 9 pages.
"Flying Motion: XPlanar," Beckhoff New Automation Technology, Nov. 1, 2018, Seiten 1-28. https://www.beckhoff.com/media/downloads/informationsmedien/beckhoff_xplanar_e.pdf.
International Search Report and Written Opinion in connection with PCT/EP2019/082536 dated Jun. 4, 2020, 25 pages including English translation.
International Search Report and Written Opinion dated Jun. 4, 2020 in connection with International Patent Application No. PCT/EP2019/082298, 25 pages including English translation.
International Search Report and Written Opinion dated Jun. 4, 2020 in connection with International Patent Application No. PCT/EP2019/082515, 29 pages including English translation.
International Search Report and Written Opinion dated Jun. 4, 2020 in connection with International Patent Application No. PCT/EP2019/082518, 25 pages including English translation.
International Search Report and Written Opinion dated Jun. 4, 2021 in connection with International Patent Application No. PCT/EP2019/082257, 25 pages including English translation.
Amato et al. "A Randomized Roadmap Method for Path and Manipulation Planning," IEEE, Apr. 1996, 8 pages.
Bortoff, Scott A. "Path Planning for UAVs" Proceedings of hte American Control Conference, Jun. 2000, 5 pages.
Bounini et al. "Modified Artificial Potential Field Method for Online Path Planning Applications," IEEE Intelligent Vehicles Symposium, Jun. 11, 2017, 7 pages.
Carbone et al. "Motion and Operation Planning of Robotic Systems: Background and Practical Approaches," Jan. 2015, 42 pages.

(56) References Cited

OTHER PUBLICATIONS

Correll, Nikolaus. "Introduction to Autonomous Robots," V1.7, Oct. 6, 2016, 10 pages.
Gasparetto et al. "Path Planning and Trajectory Planning Algorithms: A General Overview," 2015, 26 pages.
Gayle, et al. "Reactive deformation roadmaps: motion planning of multiple robots in dynamic environments." Proceedings of the 2007 IEEE/RSJ International Conference on Intelligent Robots and Systems, Oct. 29-Nov. 2, 2007, S. 3777-3787.
Kavraki et al. "Probabilistic Roadmaps for Path Planning in High-Dimensional Configuration Spaces," IEEE, vol. 12, No. 4, Aug. 1996, 15 pages.
Kim, et al. "Probabilistic Vehicle Trajectory Prediction over 1 Recurrent Neural Network," arxiv.org, Cornell University Library, 201 Olin Library Cor 14853, Apr. 24, 2017.
Le-Anh, et al. "A review of design and control of automated guided vehicle systems," European Journal of Operational Research, 171 (2006), pp. 1-23.
Nieuwenhuisen et al. "Local Multiresolution Path Planning in Soccer Games Based on Projected Intentions," Mar. 2012, 32 pages.
Padilla Cataneda et al. "Local Autonomous Robot Navigation using Potential Fields," Jun. 1, 2008, 25 pages.
Petereit et al. "Application of Hybrid A* to an Autonomous Mobile Robot for Path Planning in Unstructured Outdoor Environments," 2012.
Röfer et al. RoboCup 2011: Robot Soccer World Cup XV, Mar. 2012, 24 pages.
Tommasino et al. "Feel the Painting': a Clinician-Friendly Approach to Programming Planar Force Fields for Haptic Devices," IEEE, 2015, 6 pages.
Trumper et al. "Design and Analysis Framework for Linear Permanent Magnet Machines," IEEE, 1994, 8 pages.
Velagapudi et al. "Decentralized prioritized planning in large multirobot teams," 2010 IEEE/RSJ International Conference on Intelligent Robots and Systems, Oct. 18, 2010, 7 pages.
Warren, Charles. "Multiple Robot Path Coordination Using Artificial Potential Fields," IEEE Conference on Robotics and Automation, May 13, 1990, 8 pages.
Zhang et al. "Probabilistic Roadmap with Self-learning for Path Planning of a Mobile Robot in a Dynamic and Unstructured Environment," IEEE, Aug. 4, 2013, 6 pages.
Office Action dated Dec. 14, 2021 in connection with Chinese patent application No. 201980077609X, 19 pages including English translation.
Office Action dated Nov. 29, 2021 in connection with Chinese Patent Application No. 201980077558.3, 10 pages Including English translation.

\* cited by examiner

DEVICE AND METHOD FOR PREVENTING A COLLISION WHEN DRIVING AT LEAST TWO MOVING ELEMENTS ON A DRIVING SURFACE

CROSS-REFERENCE TO RELATED APPLICATIONS

This application is a continuation of International Patent Application PCT/EP2019/082257, filed 22 Nov. 2019, "Device and Method for Preventing a Collision when Driving at Least Two Moving Elements on a Driving Surface," which claims the priority of German patent application DE 10 2018 129 732.7, filed 26 Nov. 2018, "Vorrichtung und Verfahren zum Vermeiden einer Kollision beim Antreiben von wenigstens zwei Movern auf einer Antriebsfläche," each of which is incorporated by reference herein, in the entirety and for all purposes.

FIELD

The present invention relates to a method and to a device for preventing a collision when driving at least two movers on a drive surface.

BACKGROUND

Planar drive systems may, inter alia, be used in automation technology, in particular in manufacturing technology, handling technology and process engineering. With planar drive systems, a movable element, referred to as a mover, of a system of a machine may be moved or positioned in at least two linearly independent directions. Planar drive systems may comprise a permanently energized electromagnetic planar motor with a planar stator and a rotor, i.e. the mover, movable on the stator in at least two directions.

In a permanently energized electromagnetic planar motor, a driving force is exerted on the mover by current-carrying conductors magnetically interacting with driving magnets of a magnet arrangement. The present invention relates in particular to embodiments of planar drive devices in which the drive magnets of an electric planar motor are arranged on the mover and the current-carrying conductors of the planar motor are arranged in a stationary drive surface.

EP 3 096 144 A1 discloses an automatic laboratory system, wherein sample carriers are provided which carry samples. Priorities are assigned to the samples. The sample carriers are moved to a processing station according to the priority of the samples.

SUMMARY

The invention provides an improved device and an improved method for preventing a collision when driving at least two movers on a drive surface.

According to one aspect, a device prevents a collision when driving at least two movers on a driving surface, each mover comprising at least a second magnetic field generator, the device comprising a plurality of sectors, the sectors comprising magnetic field generators for generating magnetic fields, wherein the sectors form the drive surface, wherein the sectors are connected to at least one control unit, wherein the control unit is embodied to carry out a path planning for the at least two movers, wherein the at least two movers are assigned a priority, the control unit being embodied to take account of the priorities of the movers in the path planning of the travel paths of the movers in such a manner that a travel path of a mover with a higher priority takes precedence over a travel path of a mover with a lower priority, so that a collision of the movers is prevented, the control unit being embodied to actuate the magnetic field generators with current in such a way that the movers may be moved over the drive surface along the determined travel paths.

According to another aspect, a method prevents a collision while determining travel paths for at least two movers on a drive surface, each mover having at least a second magnetic field generator, wherein the device comprises a plurality of sectors, the sectors comprising magnetic field generators for generating magnetic fields, the sectors forming the drive surface, wherein path planning is performed for at least two movers, at least the two movers being assigned a priority, the priorities of the movers being taken into account in the path planning of the travel paths of the movers in such a manner that a travel path of a mover with a higher priority takes precedence over a travel path of a mover with a lower priority, so that a collision of the movers is prevented.

According to another aspect, a device prevents a collision when driving a plurality of movers on a driving surface, each mover comprising at least a magnetic field generator, the device comprising a plurality of sectors, the sectors comprising magnetic field generators for generating magnetic fields, wherein the sectors form the drive surface, wherein the sectors are connected to at least one control unit, wherein the control unit is embodied to carry out a path planning for each mover, wherein each mover is assigned a priority, the control unit being embodied to take account of the priorities of the movers in the path planning of the travel paths of the movers in such a way that a travel path of a mover with a higher priority takes precedence over a travel path of a mover with a lower priority, so that a collision of the movers is prevented, the control unit being embodied to actuate the magnetic field generators of the sectors with current in such a way that the movers may be moved over the drive surface along the determined travel paths, wherein the control unit is embodied during path planning of a travel path for a mover to only take into account the travel paths of the further movers that have a higher priority than the mover for which the travel path is being planned, and to plan the travel path of the mover in such a way that the travel path of the mover does not lead to a collision with the further movers having the higher priority.

EXAMPLES

A device for preventing a collision when driving at least two movers on a driving surface is proposed, each mover comprising at least a second magnetic field generator, the device comprising a plurality of sectors, the sectors comprising magnetic field generators for generating magnetic fields, the sectors forming the driving surface, the sectors being connected to at least one control unit, the control unit being embodied to perform a travel path planning for at least two movers, wherein a priority is at least assigned to the two movers, the control unit being embodied to take into account the priorities of the movers in the planning of the travel paths of the movers in such a way a travel path of a mover with a higher priority has priority over a travel path of a mover with a lower priority, so that a collision of the movers is prevented, wherein the control unit is embodied to actuate the magnetic field generators with current in such a way that the movers may be moved over the drive surface along the determined travel paths. This makes it easy to determine a right of way for the mover with the higher priority.

In an embodiment, a first mover has a higher priority than a second mover, wherein the control unit is embodied to disregard the second mover when planning a travel path for the first mover. Thus, a simple method for considering the priorities of the movers is provided. Thus, computing time may be saved when calculating the first travel path for the first mover.

In another embodiment, the control unit is embodied during path planning to plan a second travel path for the second mover in such a way that the second travel path does not lead to a collision with the first travel path. Thus, the higher priority of the first mover is taken into account in a simple manner and a collision is prevented. For example, the second travel path may be planned at a distance from the first travel path. In addition, a crossing between the first and second travel paths may be prevented. In addition, when the paths of the two travel paths intersect, the times at which the movers pass the intersection of the paths may be offset so that no collision of the movers occurs.

Thus, the first mover is considered as a dynamic obstacle if the first mover has a higher priority than the second mover. In this way, the second mover's travel path is planned in such a way that the second mover avoids the first mover.

In an embodiment, a third mover is provided, the third mover having a lower priority than the second mover, the control unit being embodied to disregard the third mover in the path planning of the first travel path for the first mover, wherein the control unit is embodied in order not to take the third mover into account in the path planning of the second travel path for the second mover, the control unit being embodied during planning a third travel path for the third mover to plan the third travel path in such a way that the third travel path does not lead to a collision with the first and the second travel path. In this way, the priorities for more than two movers are also taken into account during path planning. Of course, more than three movers may also be provided with priorities, the travel paths of which are taken into account according to the priorities.

In another embodiment, the priority of a mover depends on an operating state or property of the mover. Thus, flexible and optimal path planning may be achieved.

In a further embodiment, the priority of a mover depends on a speed of the mover, with the priority increasing with the amount of speed. Faster movers are more difficult to brake. In addition, a higher speed results in larger radial forces during cornering. In addition, the reaction distance is longer for faster movers. Thus, it is advantageous to give higher speeds a higher priority.

In an embodiment, the smaller a distance between the mover and a target point, the higher the priority of the mover. In this way, it is achieved that a mover does not stop short of the target point. A target point may be a predetermined station at which a load is picked up or delivered. In addition, the target point may also be a processing station at which processing of the load takes place.

In an embodiment, the greater a minimum possible curve radius of a mover, the higher the priority of the mover. In the case of large minimum curve radii, the possibility of changing the travel path significantly is worse than in the case of a small minimum curve radius. Thus, it is advantageous to assign a higher priority to the more inert movers.

In another embodiment, the priority of a mover depends on a weight of the mover, in particular on a load of the mover, wherein in particular the more the weight of the mover with load, the higher the priority. The mass of the mover with load influences the possibility of changing the travel path. The higher the mass of the mover, the slower a travel path may be changed. In addition, the power consumption when changing a travel path is higher for a mover with a larger mass than for a mover with a smaller mass. In addition, the priority of the mover may depend on the type of load. For example, a liquid load has a higher priority than a solid load. In addition, a toxic load may have a higher priority than a non-toxic load.

In a further embodiment, the smaller a maximum acceleration of a mover is, the higher is the priority of the mover. The smaller the maximum acceleration is, the slower is the reaction time for changing a travel path.

In another embodiment, the priority of a mover depends on an operational state or a characteristic of a sector on which the mover is located. This allows conditions of the sectors to be taken into account in order to make an optimal selection for priority.

In an embodiment, the priority of the mover depends on a temperature of the sector on which the mover is located, with the priority increasing with increasing temperature. It may be advantageous to prevent overheating of the sectors. Thus, it is advantageous to prevent supplying power which would be required to change the path of the mover to sectors where temperatures are high.

In an embodiment, the priority of the mover depends on a power consumption of the sector. It may be advantageous to limit the power consumption of a sector to a predefinable value, e.g. to prevent overheating of the sectors.

In another embodiment, each mover is assigned an individual identifier, with the priority being determined on the basis of the mover identifier. In this way, a ranking of the priorities of the movers is unambiguously defined in a simple manner.

A method for preventing a collision when determining travel paths for at least two movers on a drive surface is proposed, each mover comprising at least a second magnetic field generator, the device comprising a plurality of sectors, the sectors comprising magnetic field generators for generating magnetic fields, the sectors forming the drive surface, wherein path planning is performed for at least two movers, wherein a priority is assigned to at least the two movers, wherein the priorities of the movers are taken into account in the path planning of the travel paths of the movers in such a way that a travel path of a mover with a higher priority has priority over a travel path of a mover with a lower priority, so that a collision of the movers is prevented.

In an embodiment, the magnetic field generators of the sectors are actuated with current in such a way that the movers are moved over the drive surface along the determined travel paths.

In another embodiment, a first mover has a higher priority than a second mover, and the second mover is not taken into account when planning a travel path for the first mover.

In another embodiment, when a second travel path for the second mover is planned, the second travel path is planned such that the second travel path does not result in a collision with the first travel path.

In an embodiment, a third mover is provided, wherein the third mover has a lower priority than the second mover, wherein the third mover is not taken into account in the path planning of the first travel path for the first mover, wherein the third mover is not taken into account in the path planning of the second travel path for the second mover, wherein the third travel path is planned in the path planning of a third travel path for the third mover in such a way that the third travel path does not lead to a collision with the first and the second travel path.

In another embodiment, the priority of the mover depends on an operational state or property of the mover.

In a further embodiment, the priority of a mover depends on a speed of the mover, with the priority increasing with increasing speed, and/or with the priority of the mover increasing with a decrease in distance to a target point of the mover, and/or with the priority of a mover being the higher, the larger a minimum possible curve radius of the mover is, and/or wherein the priority of a mover depends on a weight of the mover, in particular on a load of the mover, wherein the priority is the higher, the higher the weight of the mover with the load is, and/or wherein the priority of the mover is the higher, the smaller a maximum possible acceleration of the mover is.

In an embodiment, the priority of a mover depends on an operational state or property of a sector on which the mover is located.

In an embodiment, the priority of the mover depends on a temperature of the sector on which the mover is located, wherein the priority increases with the height of the temperature, and/or wherein the priority of the mover depends on a power consumption of the sector.

A control unit is proposed which is embodied to carry out one of the described methods.

A computer program is proposed with instructions that, when run on a computer, carry out one of the described methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to further developments of the planar drive systems disclosed in the publications WO 2013/059934 A1, WO 2015/017933 A1, WO 2015/179962 A1, WO 2015/184553 A1, WO 2015/188281 A1 and WO 2017/004716 A1. The disclosure content of the aforementioned publications is made the additional subject matter of the present description in its entirety by reference.

Furthermore, the invention relates to further developments of the planar drive systems disclosed in German patent applications 10 2017 131 304.4, 10 2017 131 314.1, and 10 2017 131 321.4, filed with the German Patent and Trademark Office on 27 Dec. 2017. The disclosure content of the German patent applications 10 2017 131 304.4, 10 2017 131 314.1, and 10 2017 131 321.4 is made the additional subject matter of the present description in its entirety by reference.

Figure 1:
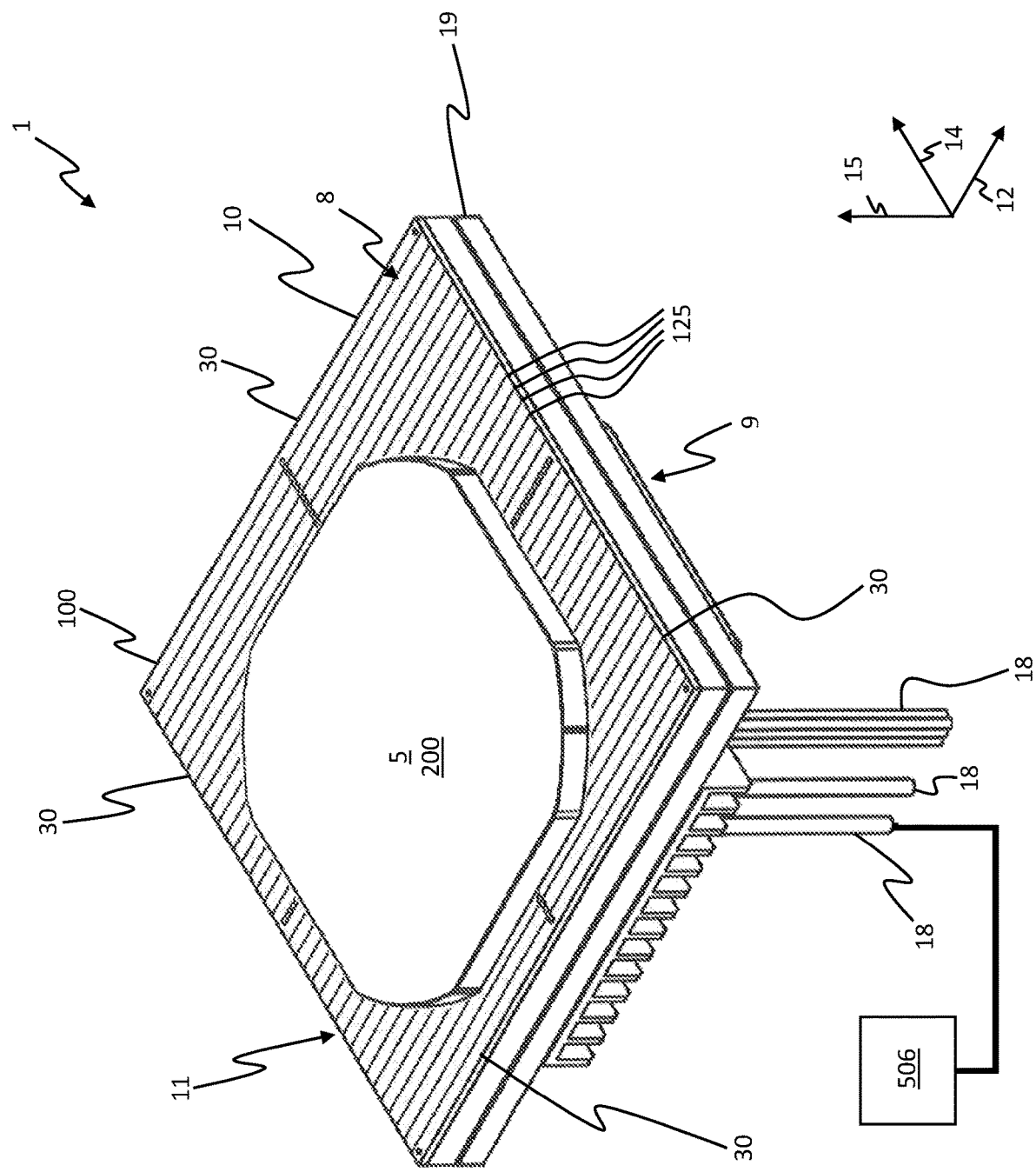
FIG. 1 shows a device for driving a mover on a drive surface.

FIG. 1 shows a device for driving at least one mover 200 on a drive surface in the form of a planar drive system 1 comprising a stator module 10 and a rotor formed by the mover 200.

The stator module 10 includes a module housing 19 and a stator assembly 100. The stator module 10 has a top side 8 and a bottom side 9 opposite the top side 8. The stator assembly 100 is arranged in a vertical direction 15 oriented from the bottom side 9 to the top side 8 above the module housing 19 and at the top side 8 of the stator module 10. The stator assembly 100 is formed as a planar stator and has a flat, i.e. planar, stator surface 11 on the upper side 8 of the stator module 10. At the same time, the stator surface 11 forms a surface of the stator module 10.

The stator surface 11 is oriented perpendicular to a vertical direction 15 and extends across the entire top surface 8 of the stator assembly 100 and the stator module 10 along directions 12 and 14. The stator assembly 100 includes at least one conductor strip 125 on the stator surface 11, to which a drive current may be applied. As shown, the stator assembly 100 may include a plurality of the conductor strips 125 on the stator surface 11. A drive current may be applied to each of the conductor strips 125 by a control unit 506. With the drive currents in the conductor strips 125, a magnetic field may be generated that drives the mover 200 in interaction with drive magnets of the mover 200. The mover 200 and the stator assembly 100 with the current-carrying conductor strips 125 form an electromagnetic planar motor. The conductor strips 125 form coil conductors of the stator assembly 100 and may also be referred to as coil conductors or as magnetic field generators.

During operation, the mover 200 is movably arranged above the stator surface 11 of the stator module 10 and, when operated, may be driven in a first direction 12 as well as in a second direction 14. The first direction 12 and the second direction 14 are linearly independent. In particular, the first direction 12 and the second direction 14 may be oriented perpendicularly with regard to each other, as shown in FIG. 1. The first direction 12 and the second direction 14 are each oriented in parallel to the stator surface 11 and perpendicular to the vertical direction 15. By driving the mover 200 in both the first direction 12 and the second direction 14, the mover 200 may be driven in any direction above the stator surface 11. In operation, the mover 200 may be held floating above the stator surface 11, e.g. by magnetic interaction between the drive magnets and suitable drive currents in the conductor strips 125. In addition to driving the mover 200 in the first and/or second directions 12, 14, it is also possible to drive it in the third, vertical direction 15. Furthermore, the mover 200 may also be rotated about its axis. The conductor strips represent conductor paths.

The stator surface 11 is rectangular in shape. In particular, the stator surface 11 may be square in shape, as shown. The stator surface 11 is limited by four respective straight outer edges 30. In each case, two mutually opposite outer edges 30 are oriented in parallel to the first direction 12 and two mutually opposite further outer edges 30 are oriented in parallel to the second direction 14.

An extension of the stator assembly 100 in the vertical direction 15 is smaller than an extension of the stator assembly 100 in the first and second directions 12, 14. Therefore, the stator assembly 100 forms a flat cuboid extending in the first and second directions 12, 14 or a plate extending in the first and second directions 12, 14.

Further components may be arranged at the module housing 19 or at the stator module 10 on the bottom side 9 of the stator module 10 or on the bottom side of the module housing 19. These further components extend at most to the outer edges 30 of the stator assembly 100 in the first direction 12 or in the second direction 14, so that the further components do not project beyond the outer edges 30 of the stator assembly 100 in the first or the second direction 12, 14.

Connections for connecting the stator module 10 to a plurality of connecting lines 18 are arranged on the bottom side of the module housing 19. The connecting lines 18 may e.g. comprise an input line of a data network, an output line of the data network, and a power supply line for supplying electrical power to the stator module 10. In addition, a control unit 506 may be connected to a connecting line 18. In particular, electrical power may be supplied to the stator module 10 via the power supply line to generate the drive currents. Via the data network, the stator module 10 may be connected to a control unit of the planar drive system, wherein the control unit of the planar drive system may be the control unit 506. With the data network, for example, control data for controlling the mover 200 or for controlling the targeted application of suitable drive currents to the conductor strips may be exchanged with the control unit 506.

In the first direction 12, the stator surface 11 may have an extension of between 100 mm and 500 mm, in particular between 120 mm and 350 mm, in particular of 240 mm. In the second direction 12, the stator surface 11 may have an extension of between 100 mm and 500 mm, in particular of between 120 mm and 350 mm, in particular of 240 mm. In the vertical direction 15, the stator module 10 may have an extension of between 10 mm and 100 mm, in particular of between 15 mm and 60 mm, in particular of 30 mm. In the vertical direction 15, the module housing 19 may have an extension of between 8 mm and 80 mm, in particular of between 13 mm and 55 mm, in particular of 26.6 mm. The module housing 19 may have the same extension in the first and/or second direction 12, 14 as the stator surface 11.

Figure 2:
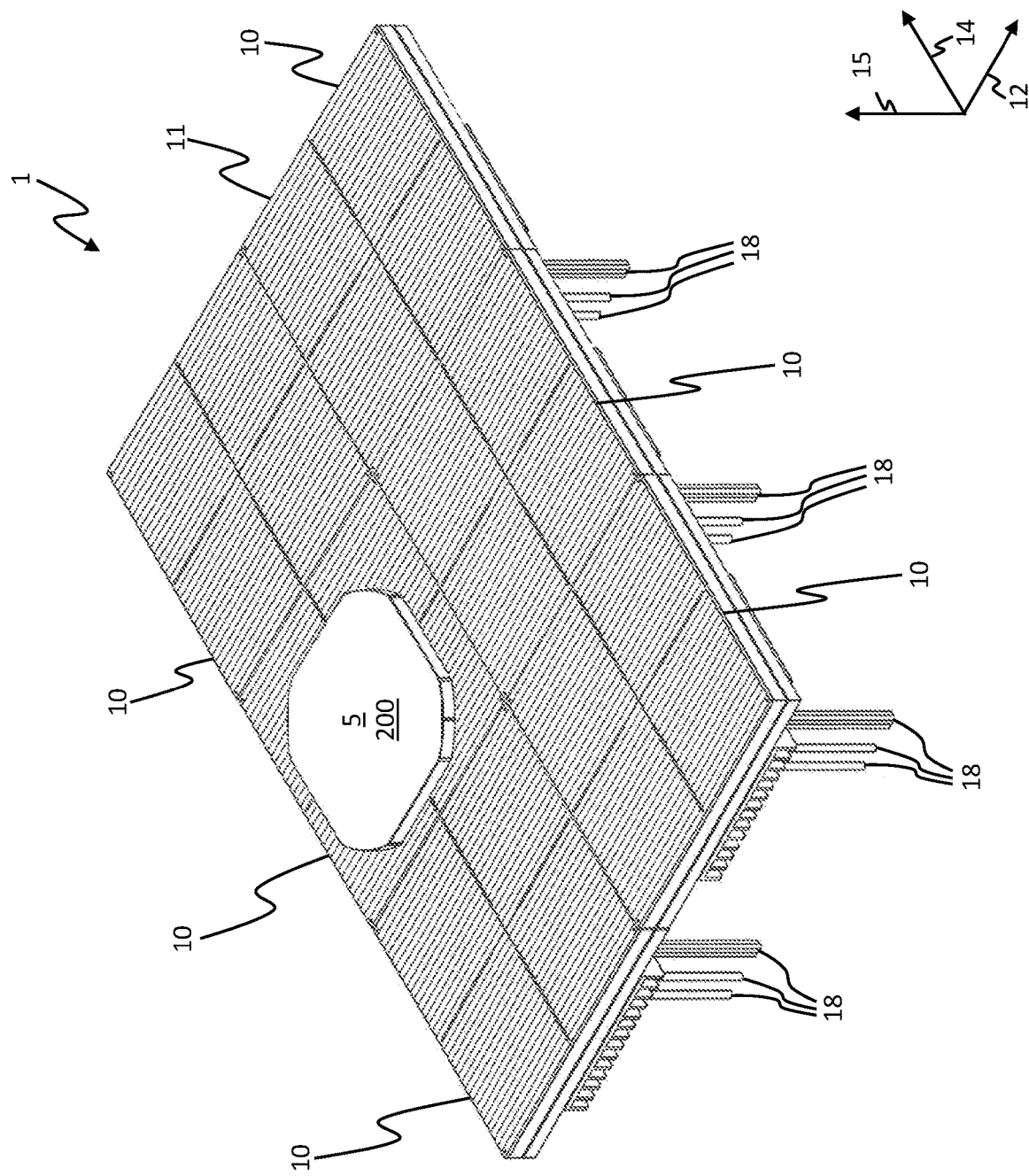
FIG. 2 shows a view of another drive system with six stator modules arranged side by side.

Multiple specimens of the stator module 10 may be arranged adjacent to each other in such a way that the outer edges 30 of adjacent stator modules 10 adjoin on one another and the stator surfaces 11 of the stator modules 10 form a continuous drive surface over which the mover 200 may be moved without interruption, as shown in FIG. 2. Since the side surfaces of the stator module 10 are flush with the stator surface 11 at the outer edges 30, the stator surfaces 11 of two adjacent stator modules 10 may be arranged almost seamlessly adjoining each other by arranging the stator modules 10 with adjoining side surfaces of the stator assemblies 100 or adjoining outer edges 30 of the stator surfaces 11.

Adjacent stator modules 10 are each arranged adjacent to each other such that the outer edges 30 of the stator surfaces 11 of adjacent stator modules 10 adjoin on one another. As a result, the stator surfaces 11 of the stator modules 10 form a continuous, planar drive surface for the mover 200. The mover 200 may be moved seamlessly from the stator surface 11 of one of the stator modules 10 onto or over the stator surface 11 of the adjacent stator module 10. Control signals and/or power may be supplied to each of the stator modules 10 via respective associated connecting lines 18. Alternative embodiments of the stator modules 10 may also include electrical connecting elements by which control signals and/or electrical power may be transmitted from one stator module 10 to the adjacent stator module 10. Such connecting elements may e.g. be arranged on the side surfaces of the stator modules 10. The connecting elements may be embodied as connectors or as contact surfaces that may be arranged adjoining one another.

In alternative embodiments, the stator modules 10 may also be connected to a central power supply device and/or a central control unit in a star configuration, each via their own connecting lines.

Figure 3:
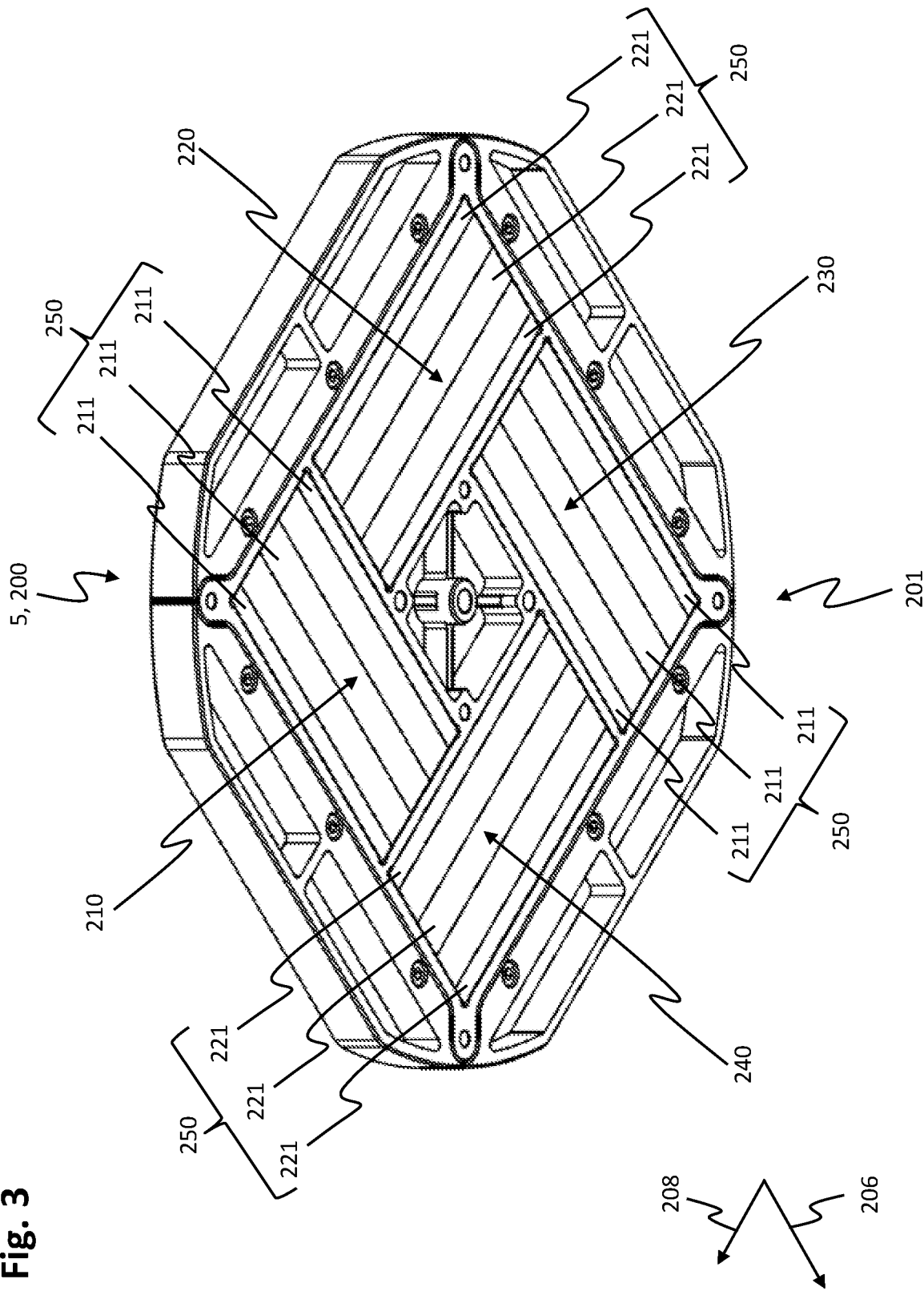
FIG. 3 shows the mover of the planar drive system with a magnet arrangement.

FIG. 3 shows the rotor, i.e. the mover 200, in a view from below onto a bottom side of the mover 200. The mover 200 comprises a magnet arrangement 201 on the bottom side. The magnet arrangement 201 is rectangular, in particular square, in shape and comprises a plurality of magnets. The bottom side of the mover 200 is flat or planar, in particular in the area of the magnets of the magnet arrangement 201. In operation, the bottom side of the mover 200 comprising the magnet arrangement 201 is essentially oriented in parallel to the stator surface 11 and is arranged facing the stator surface 11.

The magnet arrangement 201 includes a first magnet unit 210, a second magnet unit 220, a third magnet unit 230, and a fourth magnet unit 240. The first magnet unit 210 and the third magnet unit 230 each comprise drive magnets 211 extending in an elongated manner in a first rotor direction 206 and arranged side by side along a second rotor direction 208 oriented perpendicularly with regard to the first rotor direction 206. In particular, the first and third magnet units 210, 230 may each have three drive magnets 211. The second magnet unit 220 and the fourth magnet unit 240 each have further drive magnets 221 arranged side by side in the first rotor direction 206 and extending in an elongated manner along the second rotor direction 208. In operation, the first and third magnet units 210, 230 serve to drive the mover 200 in the second rotor direction 208, and the second and fourth magnet units 220, 240 serve to drive the mover 200 in the first rotor direction 206. The drive magnets 211 of the first and third magnet units 210, 230 and the further drive magnets 221 of the second and fourth magnet units 220, 240 are respectively magnetized perpendicular with regard to the first and second rotor directions 206, 208.

The drive magnets 211 and/or further drive magnets 221 represent second magnetic field generators 250. The second magnetic field generators 250 may also have other materials, functional principles and/or shapes.

Figure 4:
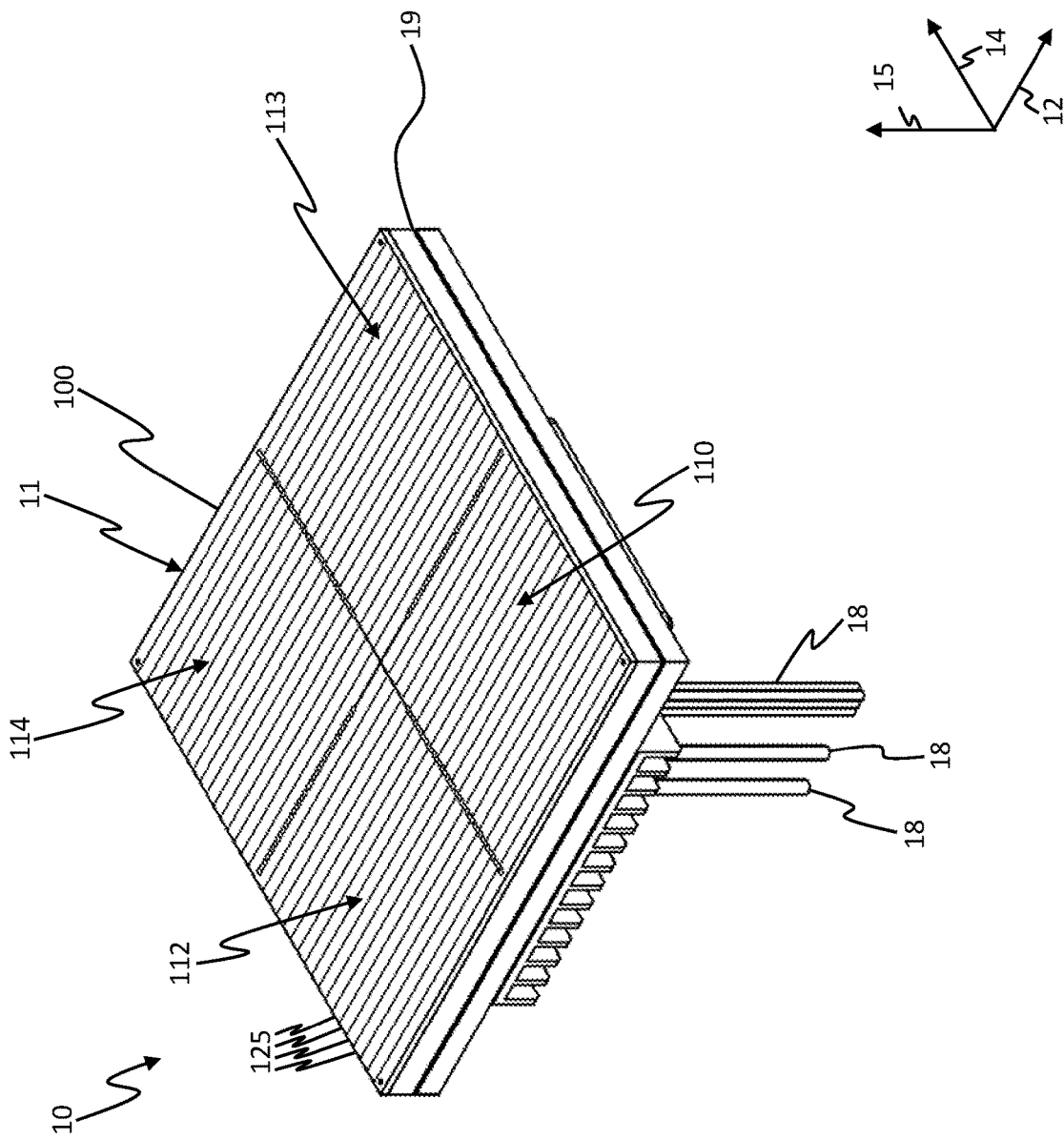
FIG. 4 shows a perspective view of a part of the drive system.

FIG. 4 shows the stator module 10 of the planar drive system 1 in a perspective view without the mover 200. The stator assembly 100 of the stator module 10 comprises a first stator sector 110, a second stator sector 112, a third stator sector 113, and a fourth stator sector 114. The stator sectors 110, 112, 113, 114 each in turn comprise a portion of conductor strips 125 disposed on the stator surface 11 of the stator assembly 100. Each of the conductor strips 125 on the stator surface 11 is arranged entirely within one of the stator sectors 110, 112, 113, 114. The stator sectors 110, 112, 113, 114 are rectangular in shape. In particular, the stator sectors 110, 112, 113, 114 may be square in shape such that an extension of the stator sectors 110, 112, 113, 114 in the first direction 12 corresponds to an extension of the stator sectors 110, 112, 113, 114 in the second direction 14.

The stator sectors 110, 112, 113, 114 each comprise a quarter of the area, i.e., a quadrant, of the stator assembly 100.

Within the stator sectors 110, 112, 113, 114, the conductor strips 125 are arranged in a plurality of stator layers or stator planes arranged on top of one another, each of the stator layers comprising only conductor strips 125 either essentially extending in an elongated manner along either the first direction 12 or essentially along the second direction 14. Apart from the extension of the conductor strips 125, and unless differences are described in the following, the stator sectors 110, 112, 113, 114 are formed identically on the different stator layers. In the stator assembly 100 of the stator module 10 shown in FIG. 4, the stator layer on the stator surface 11 comprises only conductor strips 125, which extend in an elongated manner along the first direction 12 and are arranged side by side and adjoining one another along the second direction 14.

The stator layer visible in FIG. 4 at the stator surface 11 forms a first stator layer of the stator assembly 100. In the vertical direction 15 below the first stator layer, the stator assembly 100 comprises at least one more second stator layer.

Figure 5:
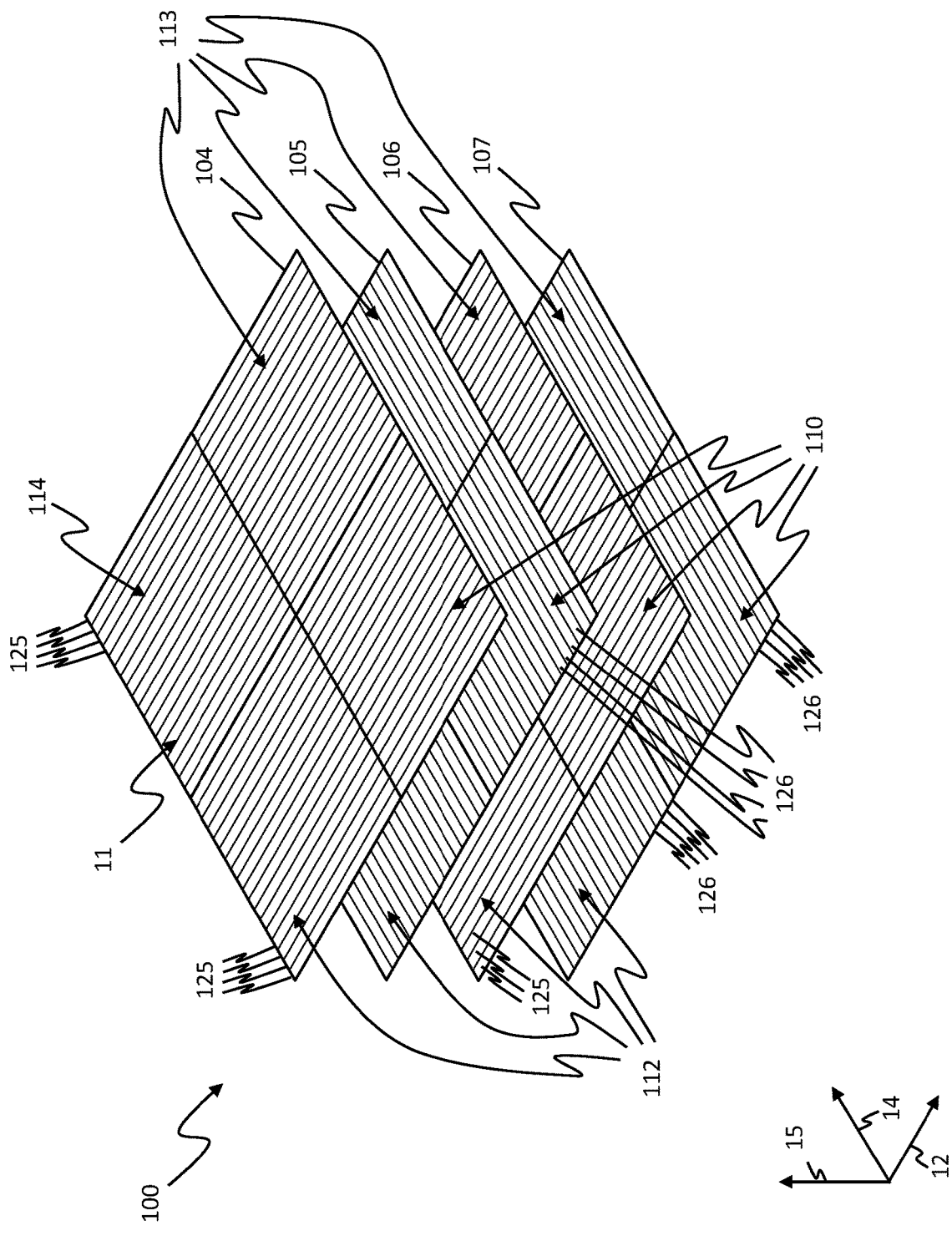
FIG. 5 shows an exploded view of a sector of the drive system with a first, second, third and fourth stator layer.

FIG. 5 shows a schematic perspective depiction of an exploded view of the stator assembly 100 with the individual stator layers.

In the vertical direction 15, the stator assembly 100 comprises a second stator layer 105 below the first stator layer 104 arranged on the stator surface 11, a third stator layer 106 below the second stator layer 105, and a fourth stator layer 107 below the third stator layer 106. Unless differences are described in the following, the second, third, and fourth stator layers 105, 106, 107 are formed like the first stator layer 104 on the stator surface 11 of the stator assembly 100 shown in FIG. 4.

In the third stator layer 106, as in the first stator layer 104, the first to fourth stator sectors 110, 112, 113, 114 comprise conductor strips 125 extending in an elongated manner along the first direction 12 and arranged side by side and adjoining one another in the second direction 14. In the second stator layer 105 and in the fourth stator layer 107, the first to fourth stator sectors 110, 112, 113, 114 comprise further conductor strips 126. Unless differences are described in the following, the further conductor strips 126 are formed like the conductor strips 125 in the first stator layer 104 and in the third stator layer 106. Unlike the conductor strips 125 of the first and third stator layers 104, 106, the further conductor strips 126 of the second and fourth stator layers 105, 107 extend in an elongated manner along the second direction 14 and are arranged side by side and adjoining one another in the first direction 12.

In the first and third stator layers 104, 106, the first to fourth stator sectors 110, 112, 113, 114 exclusively comprise the conductor strips 125 extending in an elongated manner along the first direction 12 and not additionally the further conductor strips 126 extending in an elongated manner along the second direction 14. Similarly, in the second and fourth stator layers 105, 107, the first to fourth stator sectors 110, 112, 113, 114 exclusively comprise the further conductor strips 126 extending in an elongated manner along the second direction 14 and not additionally the conductor strips 125 extending in an elongated manner along the first direction 12.

The first to fourth stator sectors 110, 112, 113, 114 each have the same dimensions in all first to fourth stator layers 104, 105, 106, 107. In particular, the first to fourth stator sectors 110, 112, 113, 114 each have the same dimensions in all first to fourth stator layers 104, 105, 106, 107 in the first direction 12 and in the second direction 14.

The conductor strips 125 and the further conductor strips 126 of first to fourth stator layers 104, 105, 106, 107 arranged on top of one another are each embodied to be electrically insulated from one another. For example, the first to fourth stator layers 104, 105, 106, 107 may each be formed as mutually insulated conductor path layers of a multi-layer printed circuit board.

The first to fourth stator sectors 110, 112, 113, 114 are embodied to be energizable independently from one another. In particular, the conductor strips 125 and the further conductor strips 126 of the first to fourth stator sectors 110, 112, 113, 114 are embodied on the stator assembly 100 to be electrically insulated from one another.

While the conductor strips 125 and the further conductor strips 126 of the individual first to fourth stator sectors 110, 112, 113, 114 on the stator assembly 100 are each embodied to be electrically isolated from the conductor strips 125 and the further conductor strips 126 of the remaining first to fourth stator sectors 110, 112, 113, 114, the conductor strips 125 and further conductor strips 126 within the individual first to fourth stator sectors 110, 112, 113, 114 may each be electrically conductively connected to one another. In particular, within each of the first to fourth stator sectors 110, 112, 113, 114, stacked conductor strips 125 of the first stator layer 104 and the third stator layer 106 may be electroconductively connected to one another. For example, respective conductor strips 125 of the first to fourth stator sectors 110, 112, 113, 114 arranged on top of one another may be connected in series. Similarly, within each of the first to fourth stator sectors 110, 112, 113, 114, further conductor strips 126 of the second stator layer 105 and the fourth stator layer 107 may be electrically conductively interconnected. For example, further conductor strips 126 of the first to fourth stator sectors 110, 112, 113, 114 arranged on top of one another may be connected in series.

Alternative embodiments of the stator assembly 100 may comprise further stator layers arranged one below the other between the second and third stator layers 105, 106 in the vertical direction 15. In this context, the stator assembly 100 may in the vertical direction 15 in each case comprise alternating stator layers having conductor strips 125 essentially extending in an elongated manner along the first direction 12 and stator layers with further conductor strips 126 essentially extending in an elongated manner along the second direction 14. In an alternative embodiment, the stator assembly 100 may in the vertical direction 15 comprise respective stator layers having conductor strips 125 essentially extending in an elongated manner along the first direction 12 and stator layers having further conductor strips 126 essentially extending in an elongated manner along the second direction 14, wherein the sum of the stator layers having conductor strips 125 essentially extending in an elongated manner along the first direction 12 and the sum of the stator layers having further conductor strips 126 essentially extending in an elongated manner along the second direction 14 have an equal mean distance from the stator surface 11. Furthermore, in alternative embodiments of the stator assembly 100, further stator layers with conductor strips 125 extending in an elongated manner along the first direction 12 or with further conductor strips 126 extending in an elongated manner along the second direction 14 may be arranged between the first and the second stator layers 104, 105 and/or between the third and the fourth stator layers 106, 107.

The conductor strips 125, 126 of the first through fourth stator sectors 110, 112, 113, 114 are respectively combined into stator segments within the first through fourth stator layers 104, 105, 106, 107.

Figure 6:
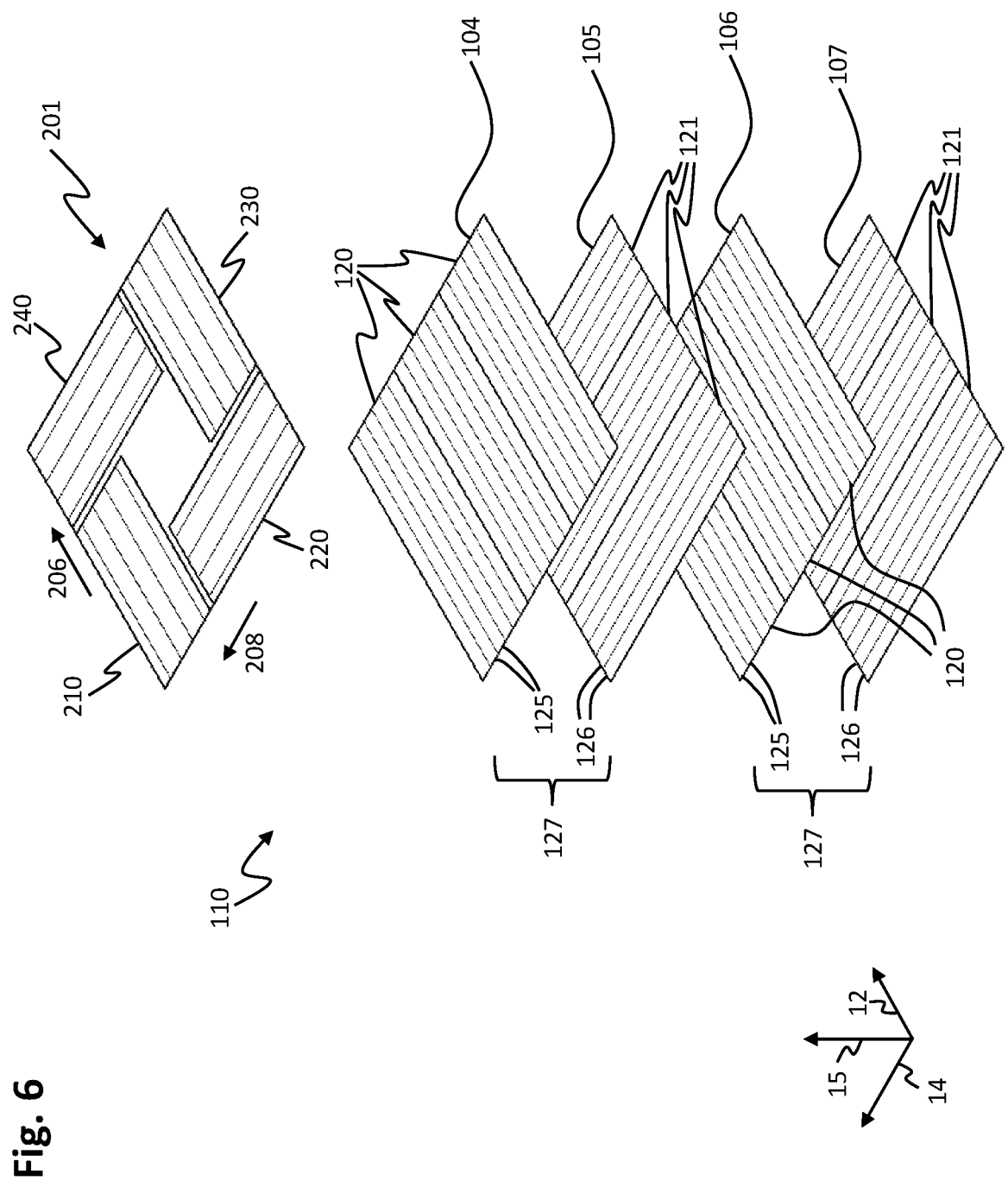
FIG. 6 shows the stator layers of the first sector of the device with individual stator segments.

FIG. 6 shows a schematic depiction of the first to fourth stator layers 104, 105, 106, 107 of the first stator sector 110 with the individual stator segments.

The conductor strips 125 and further conductor strips 126 of the first stator sector 110 are combined into stator segments 120, 121 within each of the first to fourth stator layers 104, 105, 106, 107. In each of the first to fourth stator layers 104, 105, 106, 107, the first stator sector 110 comprises three stator segments 120, 121 arranged side by side and adjoining one another. Each of the stator segments 120, 121 comprises six conductor strips 125 or further conductor strips 126 arranged side by side. The first stator sector 110 comprises three first stator segments 120 in each of the first and third stator layers 104, 106 and three second stator segments 121 in each of the second and fourth stator layers 105, 107. The first stator segments 120 each comprise six adjacent ones of the conductor strips 125 arranged side by side along the second direction 14 and extending in an elongated manner along the first direction 12, and the second stator segments 121 each comprise six adjacent ones of the further conductor strips 126 arranged side-by-side along the first direction 12 and extending in an elongated manner along the second direction 14.

Thus, in the first stator layer 104 and in the third stator layer 106, the first stator sector 110 of the stator assembly 100 exclusively comprises conductor strips 125 in an elongated manner along the first direction 12, and, in the second stator layer 105 and in the fourth stator layer 107, exclusively further conductor strips 126 in an elongated manner along the second direction 14.

The first and second stator segments 120, 121 have identical dimensions except for their orientation. In particular, the dimensions of the first stator segments 120 in the first direction 12 correspond to the dimensions of the second stator segments 121 in the second direction 14, and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and third stator layers 104, 106 of the first stator sector 110 extends in the first direction 12 over the three second stator segments 121 of the second and fourth stator layers 105, 107 of the first stator sector 110 that are arranged side by side to one another in the first direction 12. Further, the second stator segments 121 of the second and fourth stator layers 105, 107 of the first stator sector 110 extend in the second direction 14 over all of the first stator segments 120 of the first and third stator layers 104, 106 of the first stator sector 110 that are arranged side by side to one another in the second direction 14.

The arrangement of the conductor strips 125 and further conductor strips 126 in the first to fourth stator layers 104, 105, 106, 107 of the second stator sector 112, the third stator sector 113 and the fourth stator sector 114 corresponds to the arrangement of the conductor strips 125 and further conductor strips 126 in the first to fourth stator layers 104, 105, 106, 107 of the first stator sector 110 shown in FIG. 6.

When operating the planar drive system 1, the mover 200 may be aligned over the stator assembly 100 such that the first rotor direction 206 is oriented along the first direction 12 and the second rotor direction 208 is oriented along the second direction 14. In operation, the first magnet unit 210 and the third magnet unit 230 may interact with the magnetic field generated by the conductor strips 125 of the first stator segments 120 to drive the mover 200 along the second direction 14. The second magnet unit 220 and the fourth magnet unit 240 may in operation interact with the magnetic field generated by the further conductor strips 126 of the second stator segments 121 to drive the mover 200 along the first direction 12.

Alternatively, other than shown in FIG. 6, the mover 200 may be oriented such that the first rotor direction 206 is oriented along the second direction 14 and the second rotor direction 208 is oriented along the first direction 12. In this case, the first and third magnetic units 210, 230 interact with the magnetic field of the second stator segments 121 to drive the mover 200 in the first direction 12 and the second and fourth magnetic units 220, 240 interact with the magnetic field of the first stator segments 120 to drive the mover 200 in the second direction 14.

The conductor strips 125 or further conductor strips 126 of the individual first or second stator segments 120, 121 may each be supplied with the drive currents independently of the conductor strips 125 or further conductor strips 126 of the remaining first or second stator segments 120, 121. In particular, the drive currents in one of the first or second stator segments 120, 121 do not necessarily depend on drive currents in one of the other first or second stator segments 120, 121. Furthermore, the conductor strips 125 or further conductor strips 126 of one of the first or second stator segments 120, 121 may be energized with drive currents while the conductor strips 125 or further conductor strips 126 of another, for example an adjacent, first or second stator segment 120, 121 are without current. The conductor strips 125 or further conductor strips 126 of the individual first or second stator segments 120, 121 are electrically isolated from the conductor strips 125 or further conductor strips 126 of the remaining first or second stator segments 120, 121 on the stator assembly 100. The conductor strips 125 or further conductor strips 126 of different first or second stator segments 120, 121 may e.g. be supplied with the drive currents from respective separate power modules or from separate power generation units or output stages of a power module of the stator module 10.

The conductor strips 125 or further conductor strips 126 in the individual first to fourth stator sectors 110, 112, 113, 114 may each be interconnected to form multi-phase systems with a shared neutral point. The neutral point may be formed on the stator assembly 100. In particular, the conductor strips 125 or further conductor strips 126 may be interconnected to form three-phase systems with a shared neutral point. The three-phase systems may each comprise six adjacent conductor strips 125 or six adjacent further conductor strips 126. The number of adjacent conductor strips 125 or further conductor strips 126 in one of the three-phase systems may also be three, twelve or another multiple of three in each case.

The multiphase systems may be contactable on the stator assembly 100 in such a way that each of the multiphase systems may be supplied with a drive current independently of the other multiphase systems. Alternatively, two or more of the multiphase systems may each be connected to one another on the stator assembly 100 such that a common drive current is jointly applied to each of the connected multiphase systems. For example, the connected multiphase systems on the stator assembly 100 may be connected in series or in parallel.

If the conductor strips 125 or further conductor strips 126 are interconnected to form multiphase systems, fewer contacts are required for energizing the conductor strips 125 or further conductor strips 126 than when separately energizing the individual conductor strips 125 or further conductor strips 126. This reduces the amount of hardware required for energizing the conductor strips 125 or further conductor strips 126, in particular the number of power-generating units required for energization.

The first to fourth stator sectors 110, 112, 113, 114 may each include eighteen conductor strips 125 or further conductor strips 126 in each of the first through fourth stator layers 104, 105, 106, 107, as shown in FIGS. 4 and 5. Six adjacent conductor strips 125 or further conductor strips 126 may each be interconnected to form a three-phase system, and the first to fourth stator sectors 110, 112, 113, 114 may each comprise three three-phase systems side by side in the first direction 12 and three three-phase systems arranged side by side in the second direction 14. In this regard, conductor strips 125 or further conductor strips 126, which are essentially extended in the same direction 12, 14 and are positioned on top of one another in the first to fourth stator layers 104, 105, 106, 107, may be connected in series to form a common three-phase system. The conductor strips 125 or further conductor strips 126 may thereby be connected in such a way that conductor strips 125 or further conductor strips 126 positioned on top of one another in the vertical direction 15 are each supplied with the same drive current. The three-phase systems thus have three phases which are interconnected through conductor strips 125 or further conductor strips 126 positioned on top of one another in the first to fourth stator layers 104, 105, 106, 107.

For example, in each of the individual first to fourth stator layers 104, 105, 106, 107, all conductor strips 125 or further conductor strips 126 positioned on top of one another and aligned in parallel may be connected in series. In particular, the conductor strips 125 of three-phase systems positioned on top of one another in the first stator layer 104 and in the third stator layer 106, and the further conductor strips 126 of three-phase systems positioned on top of one another in the second stator layer 105 and in the fourth stator layer 107 may each be connected in series to form a shared three-phase system. Thereby, all conductor strips 125 or further conductor strips 126 of the first and third stator layers 104, 106 and of the second and fourth stator layers 105, 107 which are positioned on top of one another in the vertical direction 15 and oriented in parallel may be connected in series.

In particular, in the stator assembly 100 within the individual stator segments 120, the conductor strips 125 extending in an elongated manner along the first direction 12 are each connected to form multiphase systems with a shared neutral point. In this case, the individual multiphase systems of different stator segments 120 may each be energized independently of one another. Similarly, all further conductor strips 126 of the individual further stator segments 121 are each connected to form further multiphase systems. The individual further multiphase systems of the further stator segments 121 may each be supplied with current independently of one another and independently of the multiphase systems of the stator segments 120. In particular, the conductor strips 125 of the stator segments 120 and the further conductor strips 126 of the further stator segments 121 are each connected to form three-phase systems. A three-phase drive current may be applied to each of the conductor strips 125 and the further conductor strips 126. The drive currents comprise a first phase U, a second phase V and a third phase W, each having a phase offset of 120° with regard to one another.

The conductor strips 125 are spatially offset in the second direction 14 by in each case one third of the effective wavelength of the drive magnets 211 of the first and third magnet units 210, 230 interacting with the conductor strips 125. The further conductor strips 126 are arranged spatially offset in the first direction 12 by in each case one third of the effective further wavelength of the further drive magnets 221 of the second and fourth magnet units 220, 240 interacting with the further conductor strips 126.

The conductor strips 125 and the further conductor strips 126 represent magnetic field generators 127. The magnetic field generators 127 may also comprise other materials, functional principles and/or forms.

The mover represents the movable element, i.e. the rotor of the device and comprises elements for generating a magnetic field, in particular magnets or permanent magnets, referred to as second magnetic field generator. The magnetic field of the mover, together with the variable magnetic field of the stator assembly generated by the magnetic field generator 127, ensures that the mover is moved over the stator assembly so that, in particular, an air gap is formed between the stator assembly and the mover.

Figure 7:
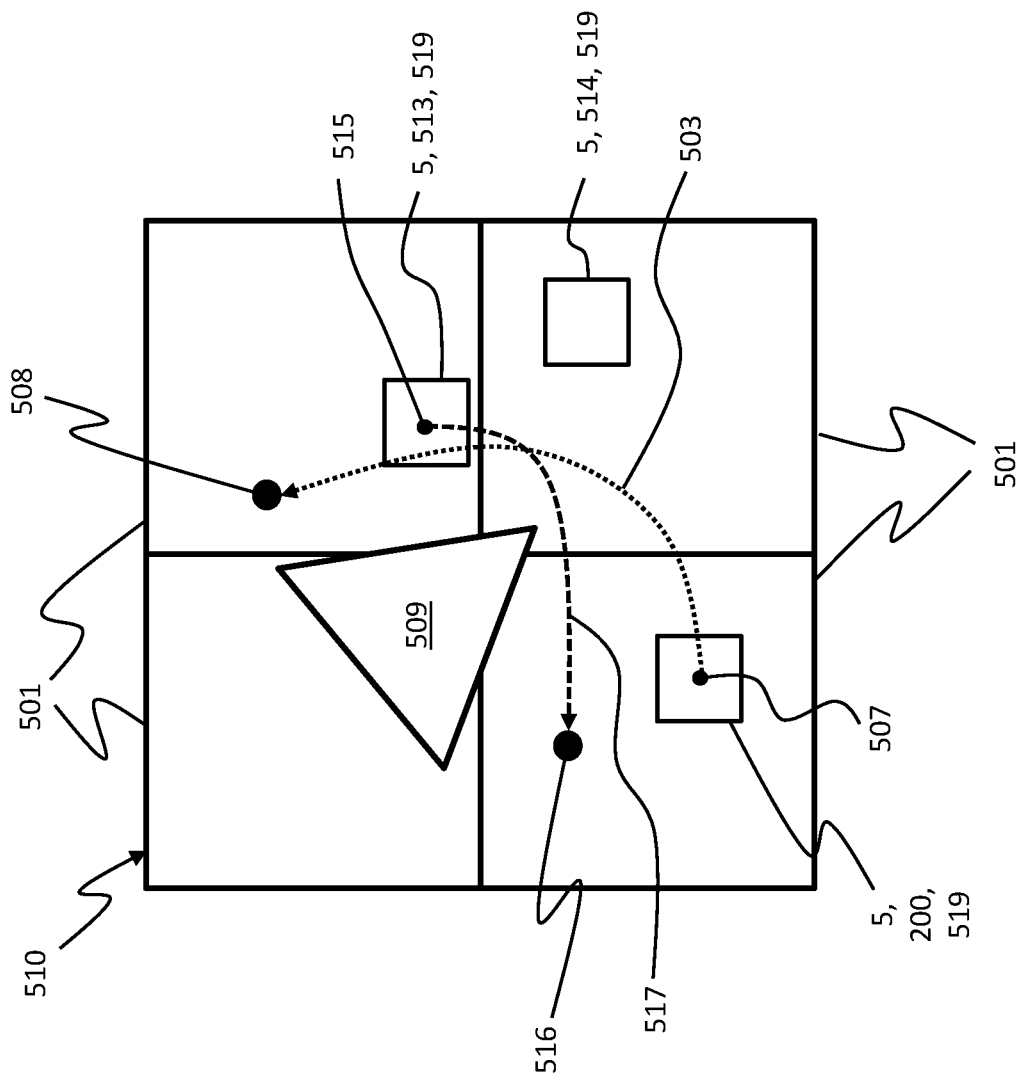
FIG. 7 shows a partial section of a drive surface on which movers move, and a control unit.

FIG. 7 shows a schematic view of a section of a drive surface 510 in a top view. The drive surface 510 may be formed by a plurality of stator modules 10 of the planar drive system described in FIGS. 1 to 6. However, other embodiments of planar drive systems that use magnetic fields to move a mover 200 on a drive surface 510 may be used, as well. Four sectors 501 are shown, wherein each sector 501 may be formed by a stator module 10 of FIGS. 1 to 6. In the embodiment example, the four sectors 501 have the shape of squares. Depending on the chosen embodiment, the sectors 501 may also have other shapes, such as rectangles or triangles, etc. For example, a sector 501 may have a size in the range of 150 mm×150 mm up to 240 mm×240 mm. Depending on the chosen embodiment, a sector 501 may also have other sizes. In addition, sectors 501 may also have different sizes.

In addition, a first mover 200, a second mover 513 and a third mover 514 are arranged on the drive surface 510. Unless a distinction is made in the following between the individual first, second or third movers 200, 513, 514, the statements made for the first mover 200, the second mover 513 and/or the third mover 514 apply in an analogous manner. Accordingly, at the corresponding locations in the following, reference will only be made to movers having the shared reference numeral 5. The first mover 200 e.g. embodied as a rotor, as described in FIGS. 1 to 3. The first mover 200 may have a square, round or rectangular shape or other shapes. For example, the first mover 200 may have a size in the range of 100 mm×100 mm up to 200 mm×200 mm. The first mover 200 may have a thickness in the range of 8 mm to 20 mm. The drive surface 510, i.e. the stator module 10, and the first mover 200 may be embodied to move the first mover 200 at a speed of e.g. 1 m/s to 6 m/s. The drive surface 510, i.e. the stator module 10, and the first mover 200 may be embodied to move the first mover 200 with an acceleration of up to 30 m/s$^2$ or more. Furthermore, the first mover 200 may be embodied to carry a load of up to 1.5 kg or more. In addition, the first mover 200 may be embodied to move at a distance from the drive surface 510 of up to 6 mm or more. The second mover 513 and/or the third mover 514 may be embodied identically to the first mover 200.

Furthermore, a static obstacle 509 is additionally arranged on the drive surface 510. The control unit 506 is connected to a data memory 512 and is directly or indirectly connected to the magnetic field generators of the sectors 501. In addition, the control unit 506 is connected to sensors 560 of the drive surface 510, which e.g. detect a current position of the movers 5, a current speed of the movers 5, a current acceleration of the movers 5 and/or a current direction of movement of the movers 5 and/or a load of the movers with load material 5 and transmit them to the control unit 506.

In addition, the control unit 506 may have stored in the data memory 512 information about planned or calculated positions of the movers 5, calculated values for speeds of the movers 5, calculated values for accelerations of the movers 5, and/or calculated values for directions of movement of the movers 5, and/or a loading condition of the movers 5, and/or a weight of the load of the movers 5, and/or a weight of the mover 5, and/or values for maximum accelerations of the movers 5.

Furthermore, a priority may be stored in the data memory 512 for each mover 5. The priority of a mover 5 may e.g. depend on an operational state or characteristic of the mover 5. For example, the priority of a mover 5 may depend on a speed of the mover 5, with the priority increasing as the speed increases. Further, the priority of the mover 5 may increase as a distance to a target point 508, 516 of the mover 5 decreases. Furthermore, the priority of a mover 5 may be the higher, the larger a minimum possible radius of curvature of the mover 5 is. Furthermore, the priority of a mover 5 may depend on a weight of the mover 5, in particular on a loading of the mover 5 with a load, the priority being the higher, the higher the weight of the load is. In addition, the priority of the mover 5 may depend on the type of load. For example, a mover 5 with a liquid load may have a higher priority than a mover 5 with a solid load. Furthermore, the smaller a maximum acceleration of the mover 5 is, the higher the priority of the mover 5 may be.

Further, the priority of a mover 5 may depend on an operational state or a property of a sector 501 on which the mover 5 is located. For example, the priority of the mover 5 may depend on a temperature of the sector 501 on which the mover 5 is located, with the priority increasing as the temperature increases. In addition, the priority of the mover 5 may depend on a power consumption of the sector 501. Further, the properties of the sector may be how fast a magnetic field may be established and/or what magnetic field strength may be established by the sector 501. Moreover, each mover 5 may be assigned a fixed priority that e.g. depends on an individual identifier, e.g. a number, of the mover 5. The identifier is e.g. stored in the data memory 512. Each identifier exists only once. Thus, the identifiers may be used to easily define a clear ranking of the priorities of the movers 5.

The priority of a mover 5 may be determined by the control unit 506 according to predetermined rules. The rules may be stored in the data memory 512. Moreover, the priority of a mover 5 or the rule for determining the priority of a mover 5 may be changed by an operator by a corresponding input to the control unit 506.

The control unit 506 is embodied to determine travel paths for the movers 5 from the respective starting points of the movers 5 to the respective target points of the movers 5 depending on predefined boundary conditions. For this purpose, the control unit 506 first checks the priorities of the movers 5. The priorities of the movers 5 may be permanently stored in the data memory 512 or may be determined currently prior to determining the travel paths depending on further parameters.

In the following, only three movers 200, 513, 514 are considered. The criteria for determining priorities are chosen such that the priority relation of the movers 200, 513, 514 is transitive and thus an unambiguous ranking of priorities is determined for multiple movers 200, 513, 514. Consequently, if a first mover 200 has a higher priority than a second mover 513, and the second mover 513 has a higher priority than a third mover 514, the first mover 200 thus also has a higher priority than the third mover 514.

In an embodiment, the control unit 506 first determines a first mover 200 with the highest priority. Then, the control unit 506 determines the first travel path 503 for the first mover 200 from the first starting point 507 of the first mover 200 to the first target point 508 of the first mover 200 depending on predetermined boundary conditions. In this context, the movers 5 having a lower priority and their possible travel paths are not taken into account in the path planning of the first mover 200. The travel path comprises a path and information on when the first mover 200 should be at which position of the path.

Then, the control unit 506 determines a second mover 513 having the second highest priority. Then, the control unit 506 determines a second travel path from the second starting point 515 of the second mover 513 to the second target point 516 depending on predetermined boundary conditions. In this case, the first mover 200 which has a higher priority than the second mover 513, and the first travel path 503 are taken into account in such a way that the second mover 513 avoids the first mover 200 and no collision occurs as a result. When planning the travel path for the second travel path, other movers 5, 514 that have a lower priority than the second mover 513 and their travel paths are not taken into account. In an analogous manner, the travel paths are determined for all movers 5. The control unit 506 performs dynamic planning and controls the corresponding magnetic field generators of the sectors 501 in such a way that the movers 5 are moved according to the determined travel paths.

In another embodiment, the travel paths of the movers may also be determined as follows:

The control unit 506 determines a first travel path 503 for the first mover 200 from a first starting point 507 to a first target point 508 depending on predetermined boundary conditions.

In addition, the control unit 506 determines a second travel path 517 for the second mover 513 starting from a second starting point 515 to a second target point 516. The first travel path 503 comprises a first path and information on when the first mover 200 should be at which position of the first path. The second travel path 517 comprises a second path and information on when the second mover 513 should be at which position of the second path. For a simplified illustration, the first travel path 503 is indicated as a dotted line with an arrowhead in the direction of the first target point 508, which reflects the first path. In addition, for a simplified depiction of the second travel path 517, the second travel path 517 is shown as a dotted line with an arrowhead in the direction of the second target point 516, representing the second path.

After the first and second travel paths 503, 517 have been determined by the control unit 506 or while the first and second travel paths are being determined, the control unit 506 checks whether there is a risk of collision between the first and second movers 200, 513. The danger of a collision exists if the first mover 200 and the second mover 513 would collide during a departure of the first mover 200 on the first travel path 503 and a departure of the second mover 513 on the second travel path 517. If the check shows that no collision is to be expected, the control unit 506 performs a dynamic planning and controls the corresponding magnetic field generators 127 of the sectors 501 in such a way that the first mover 200 is moved according to the first travel path 503 and the second mover 513 is moved according to the second travel path 517.

However, if the check reveals that a collision would occur between the first and second movers 200, 513, the priority of the first mover 200 is compared to the priority of the second mover 513. The first or second mover 200, 513 having the higher priority has priority in planning the travel path 503, 517, so that the first or second mover 200, 513 with the higher priority maintains the determined travel path 503, 517. For the first or second mover 200, 513 with the lower priority, the travel path 503, 517 is changed accordingly so that no collision will occur and the target is still reached as far as possible according to the specified boundary conditions. For example, the change of the first or second travel path 503, 517 due to a lower priority may consist of the first or second mover 200, 513 moving more slowly or the first or second mover 200, 513 using a different path and thus preventing a collision between the first and second movers 200, 513.

If, for example, the first mover 200 has a higher priority than the second mover 513, the second travel path 517 of the second mover 513 is changed accordingly so that a collision is prevented. Depending on the chosen embodiment, the priority may in each case be determined by the control unit 506 according to predetermined rules before the first or second travel paths 503, 517 are determined, or predetermined priorities are read out from the data memory 512 by the control unit 506.

The priorities of the movers 5 are read from the data memory 512 by the control unit 506 or determined as follows:

In a simple embodiment of the method, the priorities of the movers 5 are unambiguously defined and are e.g. determined by the identifiers assigned to the movers 5, e.g. as numbers. In this embodiment, e.g. the first or second mover 200, 513 with a smaller number has a higher priority than a first or second mover 200, 513 with a higher number.

In another embodiment, the priorities of the movers 5 may depend on several parameters and may be determined by the control unit 506 as follows.

For example, with a focus on preventing high temperatures in sectors 501, the priorities of the movers 5 may be determined as follows:

The mover 5 that is located on a sector 501 with a higher temperature or on a sector 501 with a temperature above a predetermined critical temperature has the higher priority. If at least two movers 5, i.e. the first mover 200, the second mover 513 and/or the third mover 514 are located on a sector 501 with the same high temperature or on a sector 501 with a temperature above the predetermined critical temperature, it is checked which mover 5 moves with a higher speed. The mover 5 with the higher speed has the higher priority. If at least two movers 5 have an equal current speed, then another parameter may be checked. The further parameter may e.g. be that the mover 5 having a shorter distance to its target point 508, 516 has the higher priority. If, for example, at least movers 5 have the same distance to their respective target point 508, 516, a further parameter may be checked.

For example, the further parameter may be the identifier of the mover 5. Thus, the mover 5 with the smaller identifier has the higher priority. Depending on the chosen embodiment, the mover 5 with the higher identifier may also have the higher priority.

In a further procedure in which the more inert mover 5 is prioritized in the path planning, the priority may be determined according to the following procedure: First, it is checked which of the movers 5 has to drive a larger minimum curve radius. The minimum curve radius depends on the current speed, the current weight of the mover 5 including the load, and the available force by means of which the magnetic field generators of the sectors 501 may act on the mover 5. The mover 5 that may drive a smaller curve radius has the lower priority. If at least two movers 5 are able to drive an equal minimum curve radius, another parameter may be checked.

The other parameter is, for example, the lower possible maximum acceleration. Thus, it is determined that the mover 5 which may be accelerated with a lower maximum acceleration has the higher priority. The lower possible maximum acceleration may e.g. depend on the type of mover 5, the weight of the mover 5, the possible maximum magnetic field of the sector 501 on which the mover 5 is located, etc. If at least two movers 5 may be accelerated with the same possible maximum acceleration, another parameter may be checked. The further parameter may be the distance to the respective target point 508, 516 of the respective mover 5. For example, the mover 5 with the shorter distance to the respective target point 508, 516 has the higher priority. If at least two movers 5 have the same distance to the respective target point 508, 516, a further parameter may be checked. The further parameter may be the identifier of the mover 5. The mover 5 with the smaller identifier is assigned the higher priority. Depending on the chosen embodiment, the mover 5 with the larger identifier may also be assigned the higher priority. Thus, an order of priority between the movers 5 is clearly defined for this method, as well.

Another approach to prioritizing may be to prioritize depending on the type of payload. A possible reason for prioritizing different payloads in a different manner may e.g. be that liquids as payloads are less suitable to be subjected to high accelerations and high lateral forces. Thus, it may be advantageous to give higher priority to movers 5 with a liquid payload than to solid payloads, so that movers 5 with liquid payloads may be moved more undisturbed than movers 5 with solid payloads.

In this context, the mover 5 with the higher prioritized payload is assigned the higher priority. For example, 512 rankings for the payloads and their priorities are stored in the data memory. For example, a product B may have a higher priority as a payload than a product A. In addition, product A has a higher priority as a payload than another product C. If the check shows that at least two movers 5 carry an equally highly prioritized payload, a further parameter is checked. The further parameter may be the shorter distance to the target point 508, 516 of the respective mover 5. If the distances of the at least two movers 5 to the target points 508, 516 are identical, a further parameter is checked. The further parameter may lie in the identifier of the movers 5. The mover 5 with the smaller identifier is assigned the higher priority. Depending on the chosen embodiment, the mover 5 with the larger identifier may also be assigned a higher priority.

Depending on the chosen embodiment, the control unit 506 may e.g. ignore the travel paths 517 of other movers 5, for example the second mover 513 or the third mover 514, which have a lower priority than the first mover 200, when planning the travel path for the first mover 200. Thus, the first travel path 503 of the first mover 200 does not need to be adjusted because the travel paths of the second and/or third movers 513, 514 do not need to be considered in the travel path planning for the first mover 200.

In addition, movers 200, 513, 514 having a higher priority may in path planning be considered as dynamic obstacles 519. However, in the path planning for the second mover 513, the first travel path of the first mover 200 is then taken into account in such a way that the second travel path 517 is adapted so that the first mover 200 may travel unhindered along the first travel path 503 due to its higher priority. In general, it may be said that the movers 5 or the travel path plans of the movers 5 with a higher priority are thus always taken into account in the travel path planning of movers 5 with a lower priority, and the control unit 506 selects a travel path 503, 517 for a mover 5 with a lower priority in order to avoid the other movers 5 with a higher priority.

Depending on the chosen embodiment, it is possible to switch between different priority setting methods depending on operating states of the sectors 501.

Depending on the chosen embodiment, the control unit 506 when planning the travel path of a mover 5 only considers priorities of movers 5 that are in a predetermined fixed environment with regard to the mover 5 for which the travel path planning is performed. The fixed environment may e.g. be a specified radial distance from the mover 5. In addition, the defined environment may be selected in such a way that a collision with other movers 5 outside the defined environment may be excluded within a predefined time horizon. This saves computational effort for the control unit 506. Thus, for a plurality of movers 5, the control unit 506 may comprise different local priority lists for the respective environments of the movers 55. Thus, it is not necessary that a global unique priority list is stored for all movers 5.

Moreover, depending on the chosen embodiment, the respective path planning for the individual movers 5 may be repeated at fixed time intervals, i.e. in a predetermined cycle. Moreover, the respective path planning for the different movers 5 may be executed by different control units 506, in particular by different cores of a multi-core system. Due to the unambiguous priorities of the movers 5, potential conflicts are unambiguously resolved.

By only considering the movers 5 that are within a specified environment and/or only the movers 5 that have a higher priority, path planning for multiple movers 5 is significantly simplified.

The positions of the movers 5, the speeds of the movers 5, and/or the accelerations of the movers 5 may be determined using sensors 560 associated with the sectors 501. For example, the sensors 560 may be magnetic field sensors, in particular Hall sensors. In addition, the position of the movers 5, the speeds of the movers 5, and/or the accelerations of the movers 5 may be estimated based on the actuation of the magnetic field generators 127 of the sectors 501.

After creating the travel paths 503, 517 for the movers 5, the control unit 506 performs dynamic planning and determines by means of which magnetic fields, by means of which magnetic field generators 127 the movers 5 must be moved at which times and at which locations in order to maintain the respective determined travel path 503, 517. Subsequently, the control unit 506 supplies power to the corresponding magnetic field generators 127 of the sectors 501 according to dynamic planning in order to realize the desired travel paths 503, 517 of the movers 5.

With the described method, the amount of data that must be taken into account in path planning is significantly reduced. This allows for a better scalability of the system even for a larger number of movers 5.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A device for preventing a collision when driving at least two movers on a drive surface, each mover comprising at least a second magnetic field generator, the device comprising:
   a plurality of sectors, the sectors comprising first magnetic field generators for generating magnetic fields, wherein the sectors form the drive surface,
   wherein the sectors are connected to at least one control unit,
   wherein the control unit is configured to carry out a path planning for the at least two movers, wherein the at least two movers are each assigned a priority,
   the control unit being configured to take account of the priorities of the movers in the path planning of the travel paths of the movers such that a travel path of a mover with a higher priority takes precedence over a travel path of a mover with a lower priority, so that a collision of the movers is prevented, wherein, for a first mover with a higher priority, a first travel path from a starting point of the first mover to a first target point of the first mover depending on predetermined boundary conditions is determined, a second mover with a lower priority is not considered in the path planning of a first path for the first mover and then, for the second mover with the lower priority, a second travel path from a second starting point of the second mover to a second target point depending on predetermined boundary conditions is determined, the first travel path of the first mover being taken into account in such a way that the second mover avoids the first mover and no collision occurs as a result, and
   the control unit being configured to actuate the first magnetic field generators of the sectors with current such that the movers are moved over the drive surface along the determined travel paths, wherein the magnetic fields of first magnetic field generators of the sectors drive the mover in interaction with the second magnetic field generator of the mover.

2. The device according to claim 1, wherein a first mover has a higher priority than a second mover, wherein the control unit is configured to disregard the second mover when planning a first travel path for the first mover.

3. The device according to claim 2, wherein the control unit is configured to take into account the first travel path of the first mover when planning a second travel path for the second mover and to plan the second travel path such that the second travel path does not lead to a collision of the second mover with the first mover.

4. The device according to claim 2, wherein a third mover is provided,
   the third mover having a lower priority than the second mover,
   wherein the control unit is configured not to take the third mover into account in the path planning of the first travel path for the first mover, the control unit being configured not to take the third mover into account in the path planning of the second travel path for the second mover, and wherein the control unit is configured to take into account the first travel path of the first mover and the second travel path of the second mover when planning the travel path of a third travel path for the third mover and to plan the third travel path such that the third travel path does not lead to a collision of the third mover with either the first mover or the second mover.

5. The device according to claim 1, wherein the priority of a mover depends on an operational state or a property of the mover.

6. The device according to claim 1, wherein the priority of a mover depends on an operational state or on a property of a sector on which the mover is located.

7. The device according to claim 6, wherein the priority of the mover depends on a temperature of the sector on which the mover is located, the priority increasing with the level of temperature.

8. The device according to claim 6, wherein the priority of the mover depends on a power consumption of the sector.

9. The device according to claim 1, wherein each mover is assigned an individual identifier, the priority of each mover being determined based on the identifier of the mover.

10. A method for preventing a collision while determining travel paths for at least two movers on a drive surface, each mover having at least a second magnetic field generator,
    wherein the device comprises a plurality of sectors, the sectors comprising first magnetic field generators for generating magnetic fields, the sectors forming the drive surface, and
    wherein path planning is performed for at least two movers, at least the two movers each being assigned a priority, the priorities of the movers being taken into account in the path planning of the travel paths of the movers in such a manner that a travel path of a mover with a higher priority takes precedence over a travel path of a mover with a lower priority, so that a collision of the movers is prevented;
    wherein, for the first mover with the higher priority, a first travel path from a starting point of the first mover to a first target point of the first mover depending on predetermined boundary conditions is determined, the second mover with the lower priority is not considered in the path planning of a first path for the first mover and then, for the second mover with the lower priority, a second travel path from a second starting point of the second mover to a second target point depending on predetermined boundary conditions is determined, the first travel path of the first mover being taken into account in such a way that the second mover avoids the first mover and no collision occurs as a result.

11. The method according to claim 10, wherein the priority of the mover depends on an operational state or on a property of the mover.

12. The method according to claim 10, wherein one or more of:
    the priority of a mover depends on a speed of the mover, wherein the priority increases with the speed,
    the priority of a mover increases with a decrease in a distance to a target point of the mover,
    the priority of a mover increases with larger minimum possible curve radius of the mover,
    the priority of a mover depends on a weight of the mover and on a load of the mover, wherein the priority increases with higher weight of the mover with the load, or
    the priority of a mover increases with smaller maximum possible acceleration of the mover.

13. The method according to claim 10, wherein the priority of a mover depends on an operational state or on a property of a sector on which the mover is located.

14. The method according to claim 13, wherein one or more of:
    the priority of the mover depends on a temperature of the sector on which the mover is located, the priority increasing with the temperature, or
    the priority of the mover depends on a power consumption of the sector.

15. A planar drive system comprising:
    a plurality of movers on a drive surface, each mover comprising at least a first magnetic field generator formed as one or more magnets, a plurality of sectors, the sectors comprising second magnetic field generators formed as coil conductors, the sectors forming the drive surface,
    wherein, with current in the coil conductors of the sectors, magnetic fields are generated that drive the movers in interaction with the magnets of the movers;
    wherein the sectors are connected to at least one control unit, and
    wherein the control unit is configured to carry out a path planning for each mover, wherein each mover is assigned a priority;
    the control unit being configured to take account of the priorities of the movers in the path planning of the travel paths of the movers such that a travel path of a mover with a higher priority takes precedence over a travel path of a mover with a lower priority, so that a collision of the movers is prevented, and
    the control unit being configured to actuate the magnetic field generators of the sectors with current such that the movers are moved over the drive surface along the determined travel paths;
    wherein the control unit is configured during path planning of a travel path for a mover to only take into account the travel paths of further movers that have a higher priority than the mover for which the travel path is being planned, and to plan the travel path of the mover such that the travel path of the mover does not lead to a collision with the further movers having the higher priority, wherein, for a first mover with a higher priority, a first travel path from a starting point of the first mover to a first target point of the first mover depending on predetermined boundary conditions is determined, a second mover with a lower priority is not considered in the path planning of a first path for the first mover and then, for the second mover with the lower priority, a second travel path from a second starting point of the second mover to a second target point depending on predetermined boundary conditions is determined, the first travel path of the first mover being taken into account in such a way that the second mover avoids the first mover and no collision occurs as a result.

16. The system according to claim 15, wherein one or more of:
    the priority of a mover depends on a speed of the mover, the priority increasing with the speed,
    the priority of a mover increases with a decrease in distance of the mover with regard to a target point, the priority of a mover increases with larger minimum possible curve radius of the mover, the priority of a mover depends on a weight of the mover and on a load of the mover, wherein the priority increases with higher weight of the mover with the load, or the priority of a mover increases with smaller maximum acceleration of the mover.

17. The system according to claim 15, wherein the priority of a mover depends on an operational state or on a property of a sector on which the mover is located.

18. The system according to claim 15, wherein:
the priority of the mover depends on a temperature of the sector on which the mover is located, the priority increasing with the temperature, or
the priority of a mover depends on a power consumption of the sector.

19. The system according to claim 15, wherein each mover is assigned an individual identifier, the priority of each mover being determined based on the identifier of the mover.

* * * * *